US 9,785,265 B2

(12) United States Patent
Park et al.

(10) Patent No.: US 9,785,265 B2
(45) Date of Patent: Oct. 10, 2017

(54) REAL-TIME REMOTE CONTROL SYSTEM FOR SEMICONDUCTOR AUTOMATION EQUIPMENT

(71) Applicant: BARON SYSTEM CO., LTD, Suwon-Si, Gyeonggi-Do (KR)

(72) Inventors: Gi Beom Park, Suwon-Si (KR); Myoung Soo Yu, Hwaseong-Si (KR)

(73) Assignee: BARON SYSTEM CO., LTD, Suwon-si (KR)

( * ) Notice: Subject to any disclaimer, the term of this patent is extended or adjusted under 35 U.S.C. 154(b) by 372 days.

(21) Appl. No.: 14/606,587

(22) Filed: Jan. 27, 2015

(65) Prior Publication Data

US 2016/0062351 A1     Mar. 3, 2016

(30) Foreign Application Priority Data

Sep. 3, 2014 (KR) .............................. 2014-0117174

(51) Int. Cl.
*G05B 19/418* (2006.01)
*G06F 3/038* (2013.01)

(52) U.S. Cl.
CPC ........... *G06F 3/038* (2013.01); *G05B 19/418* (2013.01)

(58) Field of Classification Search
CPC .......... G05B 19/418; G06F 3/00; G06F 3/038
See application file for complete search history.

(56) References Cited

U.S. PATENT DOCUMENTS

| 7,286,896 B2 * | 10/2007 | Liu | G05B 19/409 |
| | | | 700/121 |
| 2002/0198964 A1 * | 12/2002 | Fukazawa | G05B 19/4185 |
| | | | 709/219 |
| 2015/0066185 A1 * | 3/2015 | Kim | G05B 19/4184 |
| | | | 700/108 |

FOREIGN PATENT DOCUMENTS

KR     20130096439 A    *   8/2013

* cited by examiner

*Primary Examiner* — Chun Cao
(74) *Attorney, Agent, or Firm* — Weiss & Moy, P.C.; Jeffrey D. Moy

(57) ABSTRACT

Disclosed is a real-time remote control system for semiconductor automation equipment which may monitor an operating condition of the semiconductor automation equipment in real-time and enable an Internet protocol (IP) to be shared, so that a plurality of semiconductor automation equipment computers are reliably connected. By transmitting a mouse signal of a remote computer via a serial port of the semiconductor automation equipment computer, even semiconductor automation equipment that does not support USB/PS2 ports can transmit a remote control signal through a mouse of the remote computer, and transmit a signal for monitoring or controlling an operation of the semiconductor automation equipment without a separate IP allocation operation in real-time.

7 Claims, 13 Drawing Sheets

REAL-TIME REMOTE CONTROL SYSTEM FOR SEMICONDUCTOR AUTOMATION EQUIPMENT

CROSS-REFERENCE TO RELATED APPLICATION

This application claims priority to and the benefit of Korean Patent Application No. 2014-0117174, filed on Sep. 3, 2014, the disclosure of which is incorporated herein by reference in its entirety.

BACKGROUND

1. Field of the Invention

The present invention relates to real-time remote control technology of semiconductor automation equipment, and more particularly, to a real-time remote control system for semiconductor automation equipment which may monitor an operating condition of the semiconductor automation equipment in real-time and enable an Internet protocol (IP) to be shared, so that a plurality of semiconductor automation equipment computers are reliably connected.

2. Discussion of Related Art

A remote control system (RCS) generally refers to a system that controls an automation apparatus using a wired or wireless channel in a place far away from the automation apparatus. A method of transmitting an image of a computer screen for a long distance utilizing the RCS is widely used in customer support after-services, remote server management, and the like, and primarily used especially in semiconductor automation equipment control.

In general, when the semiconductor automation equipment is controlled from a remote location, keyboard and mouse control is performed by transmitting and receiving signals to and from a USB or PS/2 port installed in a PC, but a conventional semiconductor automation equipment PC uses a method of transmitting touch signals input to a touch monitor without supporting the USB or PS/2 port as shown in FIG. 12.

In this case, a front computer and a rear computer communicate with each other in a RS-232C communication format, and in this instance, do not support the USB/PS2 port, and therefore only a touch input is possible. As a result, there are problems in that the conventional RCS for supporting only the USB/PS2 port cannot be applied, and a mouse cannot be used in a remote computer.

In addition, in a conventional RCS for semiconductor automation equipment by RCS, when an existing router is used, a public IP from a high order communication unit is automatically assigned in a low order communication unit and changed into an internal communication IP as shown in FIG. 13, and in this case, a fixed IP cannot be used, and therefore communication with the high order communication unit is impossible.

Thus, in order to use a remote system without changing an IP, there is a problem in that an IP for remote control should be extended and used.

A conventional remote control method for semiconductor automation equipment may be classified into a software method and a hardware method, and in a case of the software method, software for remote control is installed in a remote computer and a local computer as disclosed in Korean Unexamined Patent Application Publication No. 10-2010-0011763 (Feb. 3, 2010). In this case, there is a problem in that connection between the remote computer and the local computer is impossible when operating systems (OP) of the remote computer and the local computer are not the same.

SUMMARY OF THE INVENTION

The present invention is directed to a real-time remote control system for semiconductor automation equipment which may transmit mouse signals of a remote computer through a serial port of a semiconductor automation equipment computer, and transmit signals for monitoring and controlling operations of the semiconductor automation equipment in real-time without a separate IP allocation operation.

According to an aspect of the present invention, there is provided a real-time remote control system for semiconductor automation equipment including: a remote control converter that connects a semiconductor automation equipment computer and a remote computer to transmit a signal for monitoring or controlling an operation of the semiconductor automation equipment; and a serial splitter that converts a mouse signal of the remote computer transmitted from the remote control converter into touch panel data of the semiconductor automation equipment computer to transmit the touch panel data, and transmits a touch panel signal between front and rear computers of the semiconductor automation equipment, wherein the remote control converter includes a serial port output unit that outputs mouse event data of the remote computer to a serial port, a network transmission processing unit that sets a media access control (MAC) address transmitted from a high order and the same IP address in accordance with a state in which processing data and setting data are transmitted from the semiconductor automation equipment computer to the remote computer and a state in which an input device control signal is transmitted from the remote computer to the semiconductor automation equipment computer, to thereby control data transmission and reception, and an image processing unit that is connected to an image output unit of the semiconductor automation equipment to convert data of the image output unit into image data capable of being processed in the remote computer, and wherein the remote computer includes a coordinate conversion unit that converts, when a mouse event of the remote computer occurs, relative coordinate data of a point at which the mouse event occurs into absolute coordinate data.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a real-time remote control system for semiconductor automation equipment according to an embodiment of the present invention will be described in detail.

The real-time remote control system for semiconductor automation equipment according to an embodiment of the present invention includes a remote control converter that connects a semiconductor automation equipment computer and a remote computer to transmit a signal for monitoring or controlling an operation of the semiconductor automation equipment, and a serial splitter that converts a mouse signal of the remote computer transmitted from the remote control converter into touch panel data of the semiconductor automation equipment computer to transmit the touch panel data, and transmits a touch panel signal between front and rear computers of the semiconductor automation equipment.

Figure 1:
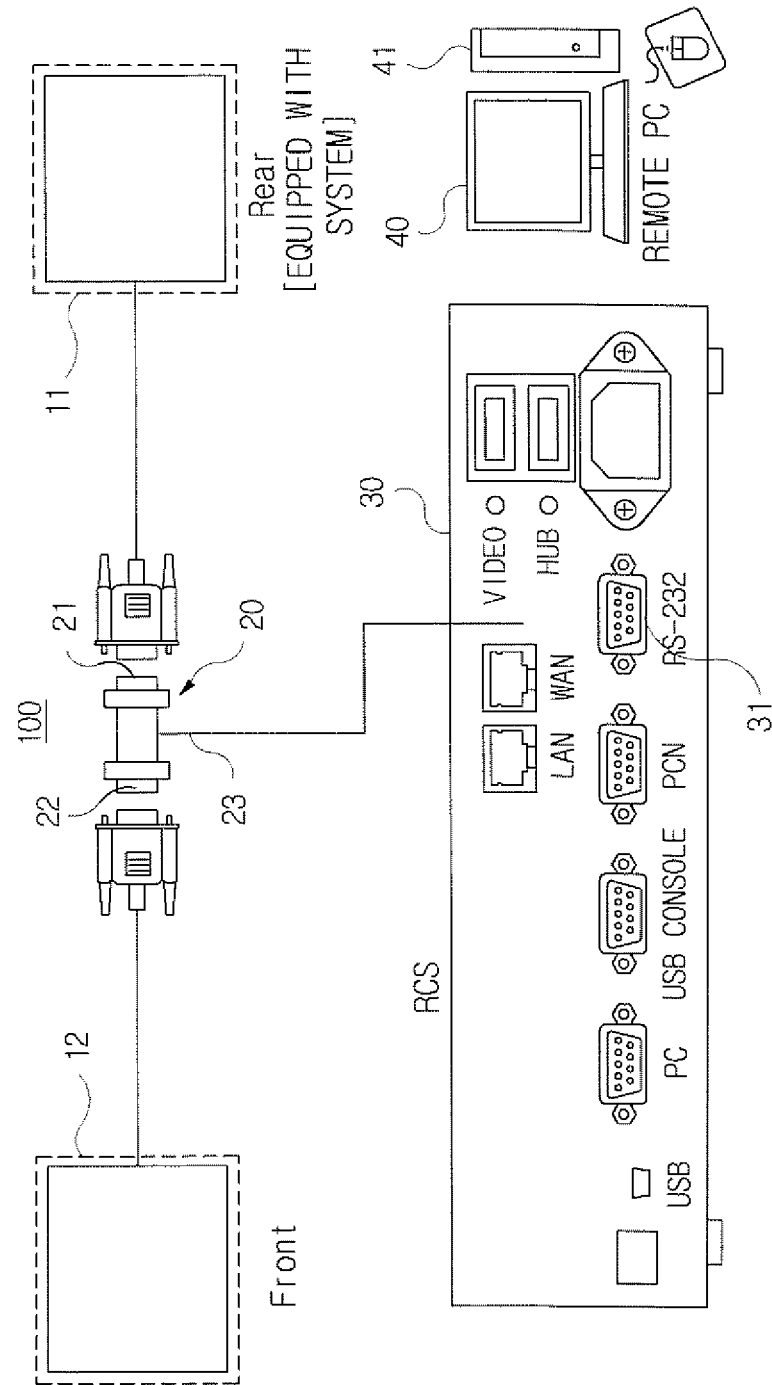
FIG. 1 is a conceptual diagram illustrating a connection status of a serial splitter in a real-time remote control system for semiconductor automation equipment according to an embodiment of the present invention.

In FIG. 1, in the real-time remote control system for semiconductor automation equipment according to an embodiment of the present invention, a connection status among a serial splitter 20, a remote control converter 30, and a remote computer 40 is shown. In FIG. 1, in the semiconductor automation equipment, USB/PS2 ports are not supported, and the serial splitter 20 according to the present invention is connected to each of rear and front computers 11 and 12 for transmitting a touch signal of a monitor to a serial port, and is connected to a serial port output unit 31 of the remote control converter 30.

The rear computer 11 according to the present invention is equipped with a system for controlling the semiconductor automation equipment, and transmits a monitor touch signal to the front computer 12. According to an embodiment of the present invention, the remote computer 40 includes a coordinate conversion unit 41 that converts, when a mouse event occurs, relative coordinate data of a point at which the mouse event occurs into absolute coordinate data.

Figure 2:
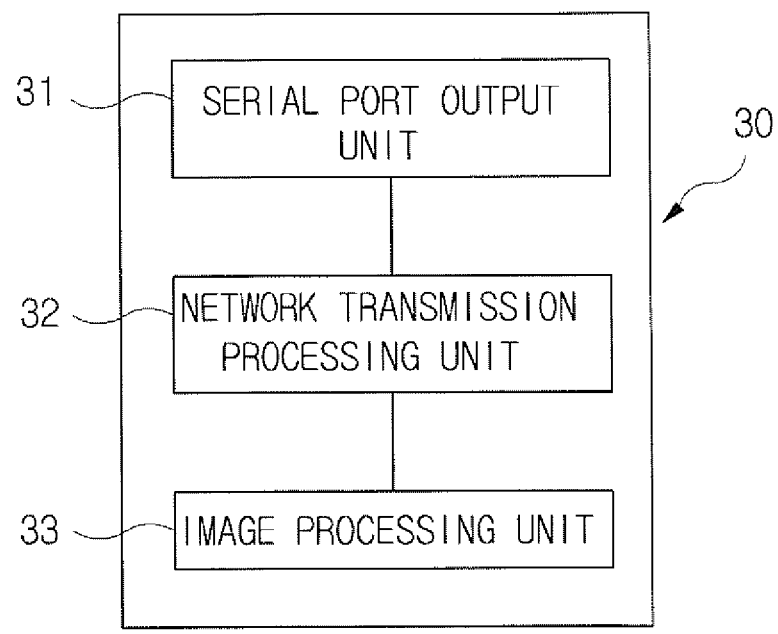
FIG. 2 is a diagram illustrating a detailed configuration of a remote control converter in a real-time remote control system for semiconductor automation equipment according to an embodiment of the present invention.

In addition, the remote control converter 30 according to the present invention includes the serial port output unit 31, a network transmission processing unit 32, and an image processing unit 33 as shown in FIG. 2. The serial port output unit 31 transmits a mouse point signal in accordance with occurrence of the mouse event of the remote computer 40 to the serial splitter 20.

Figure 3:
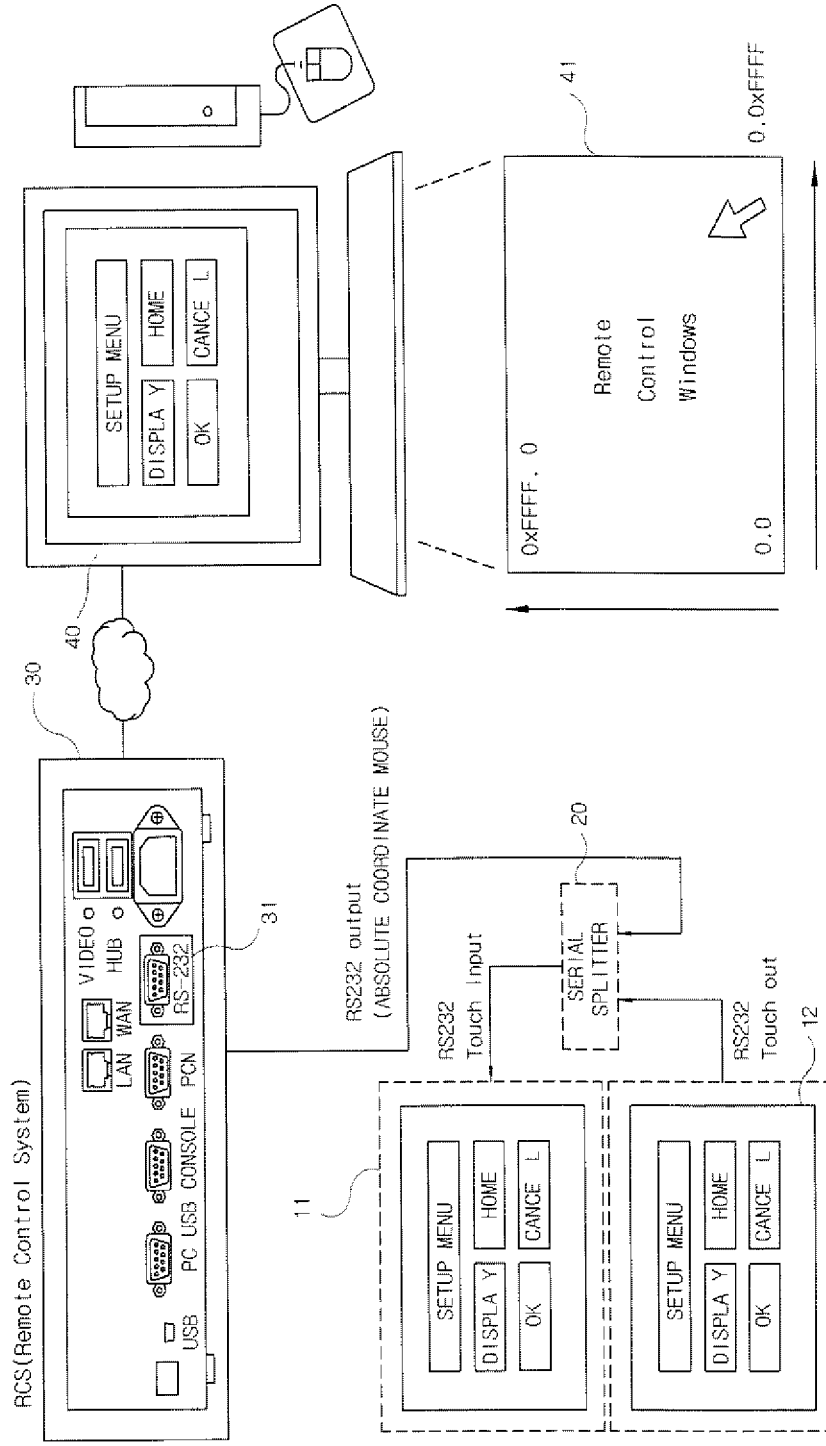
FIG. 3 is a conceptual diagram illustrating a signal transmission process of a serial splitter in a real-time remote control system for semiconductor automation equipment according to an embodiment of the present invention.

FIG. 3 is a diagram illustrating a signal transmission process in accordance with occurrence of a mouse event of the remote computer 40. When a mouse event occurs in the remote computer 40, the coordinate conversion unit 41 converts relative coordinate data according to movement of a mouse into absolute coordinate data.

Figure 4:
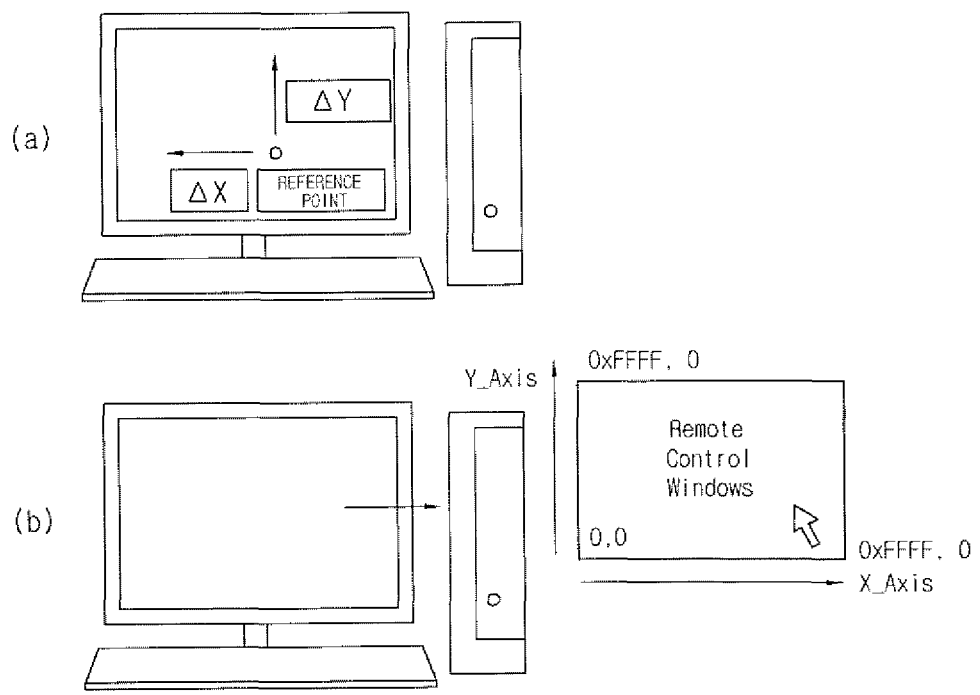
FIG. 4 is a conceptual diagram illustrating a concept of relative coordinates and absolute coordinates of a mouse in FIG. 5 is a diagram illustrating an example showing a communication speed of a serial splitter in a real-time remote control system for semiconductor automation equipment according to an embodiment of the present invention.

The relative coordinate data according to the present invention is calculated as a coordinate value moved from a reference point, that is, Δx and Δy values as shown in (a) of FIG. 4, and the calculated relative coordinate data is transmitted to the remote computer 40 to be displayed on a display. In addition, according to the present invention, the absolute coordinate data is a coordinate value that is set at a predetermined interval starting from the origin (0, 0) of x-axis and y-axis of the monitor up to distal ends (0xFFF, 0XFFFF) of the x-axis and y-axis, and may be represented as a unique coordinate value (for example, −200, 300) with respect to a specific point of the monitor.

A mouse signal converted into absolute coordinate data through the coordinate conversion unit 41 is transmitted to the remote control converter 30 through Ethernet, and transmitted to the serial splitter 20 through the serial port output unit 31 of the remote control converter 30.

In addition, the serial splitter 20 converts the received absolute coordinate data into touch panel data, determines priorities among touch panel data that are point-to-point monitor touch signals between the existing rear and front computers 11 and 12, and transmits the touch panel data to the front computer 12.

Figure 5:
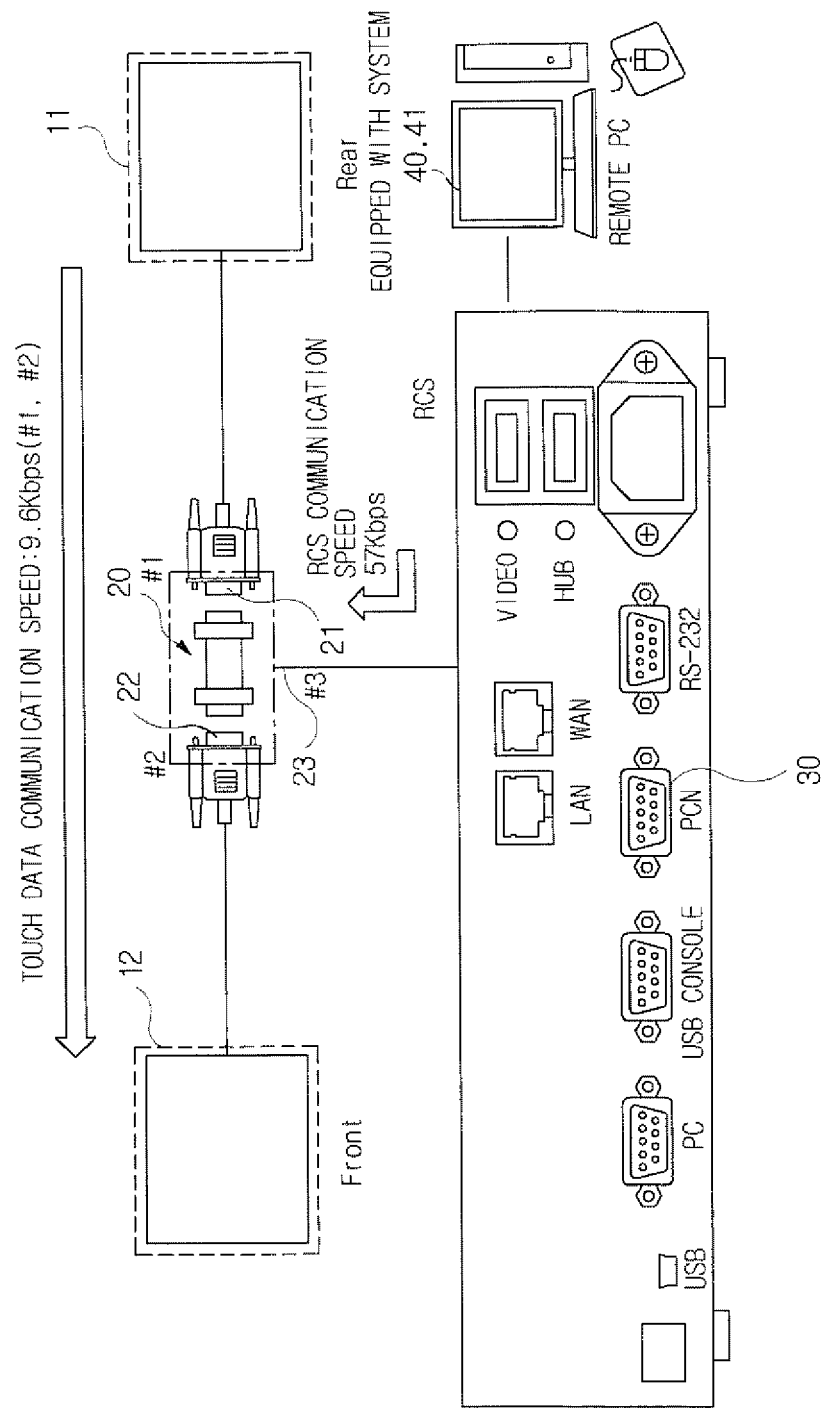

FIG. 5 is a diagram illustrating an example of the serial splitter 20 according to an embodiment of the present invention. The serial splitter 20 has a gender type that connects at least three serial ports, and includes a first terminal 21 connected to an RS-232C port of the rear computer 11 of the semiconductor automation equipment computer, a second terminal 22 connected to an RS-232C port of the front computer 12 of the semiconductor automation equipment computer, and a third terminal 23 connected to an RS-232C port of the remote control converter. In an embodiment of the present invention, a communication speed according to transmission of a point-to-point touch signal between the rear computer 11 and the front computer 12 was measured to be 9.6 Kbps, and a communication speed according to transmission of the absolute coordinate data between the remote control converter 30 and the serial splitter 20 was measured to be 57 Kbps.

Figure 6:
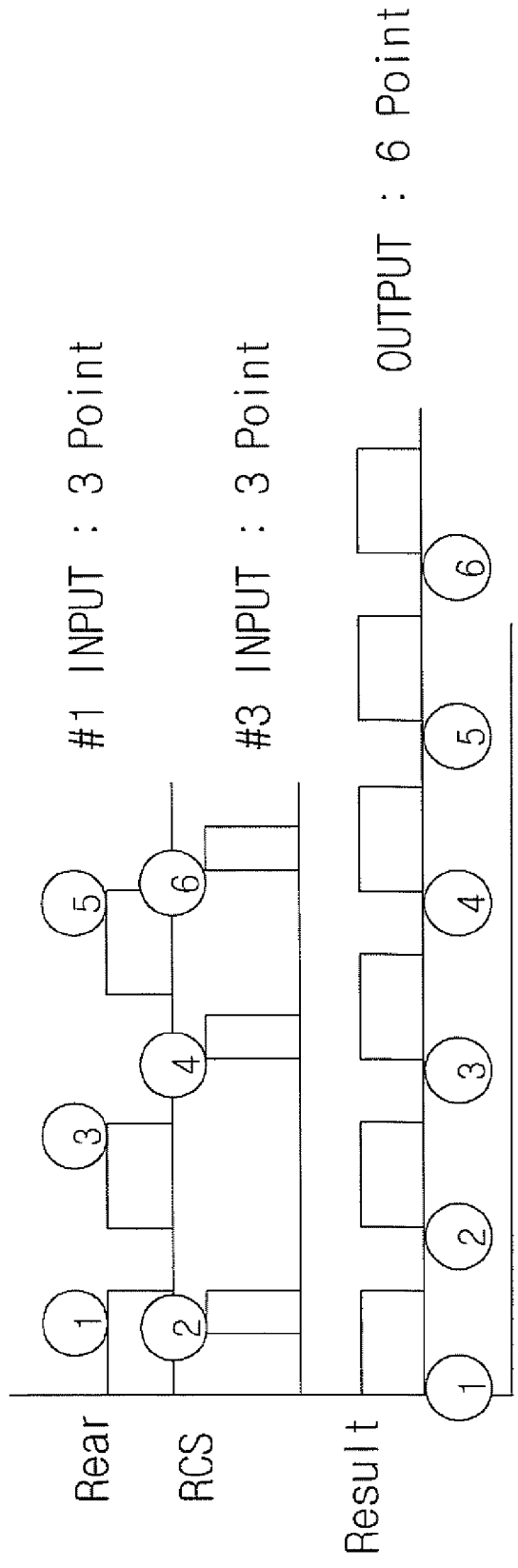
FIG. 6 is a diagram illustrating an output signal generation process in accordance with generation of an input signal of a serial splitter in a real-time remote control system for semiconductor automation equipment according to an embodiment of the present invention.

FIG. 6 is a diagram illustrating a concept of output signal generation in accordance with an input signal of the serial splitter according to an embodiment of the present invention. When a touch signal is input through the first terminal 21 connected to the rear computer 11 a total of three times (first signal, third signal, and fifth signal) and a remote mouse signal is input through the third terminal 23 connected to the remote control converter 30 a total of three times (second signal, fourth signal, and sixth signal), corresponding input times are recognized as priorities, so that the first to sixth signals are sequentially output at a predetermined time interval (being 10 ms in an embodiment of the present invention), and the touch signal of the rear computer 11 and the mouse signal of the remote computer 40 may be transmitted to the front computer 12 without causing omission of the touch signal of the rear computer 11 and the mouse signal of the remote computer 40.

As described above, through a configuration of the serial splitter 20 according to the present invention, there are advantages in that a remote PC can communicate with non-PC-based semiconductor automation equipment such as Linux, Lynx, touch screen, or non-window, a mouse signal for a long distance can be transmitted even though a PS/2 or a USB mouse port is not supported in a semiconductor automation equipment system, and it is possible to autonomously deal with a communication protocol for each semiconductor automation equipment.

Figure 7:
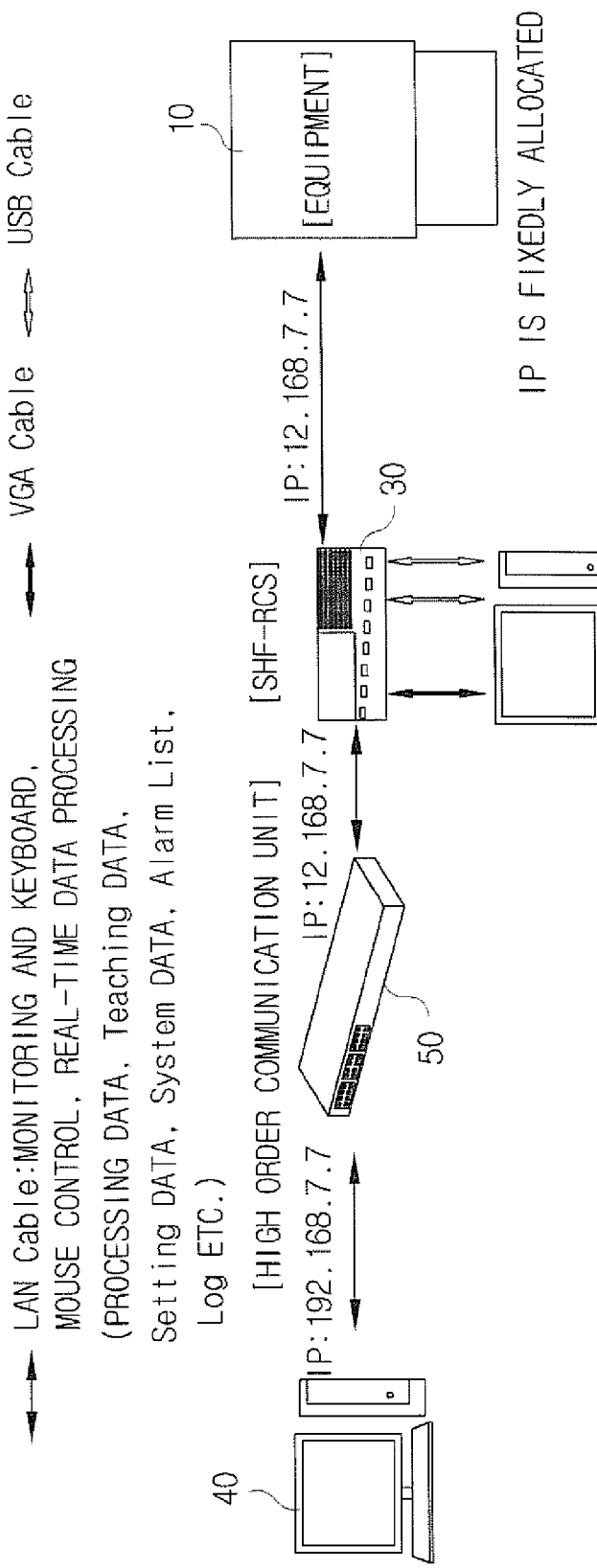
FIG. 7 is a diagram illustrating an IP sharing concept of a network transmission processing unit of a remote control converter in a real-time remote control system for semiconductor automation equipment according to an embodiment of the present invention.

FIG. 7 is a diagram illustrating an IP sharing concept of the network transmission processing unit 32 of the remote control converter 30 in a real-time remote control system for semiconductor automation equipment according to an embodiment of the present invention. In FIG. 7, the network transmission processing unit 32 enables a port for transmitting processing data and setting data of the semiconductor automation equipment and a port for transmitting an input device control signal transmitted from the remote computer to the semiconductor automation equipment computer to communicate with each other using the same IP address.

Hereinafter, an operation of the network transmission processing unit 32 according to an embodiment of the present invention will be described in more detail.

Figure 8:
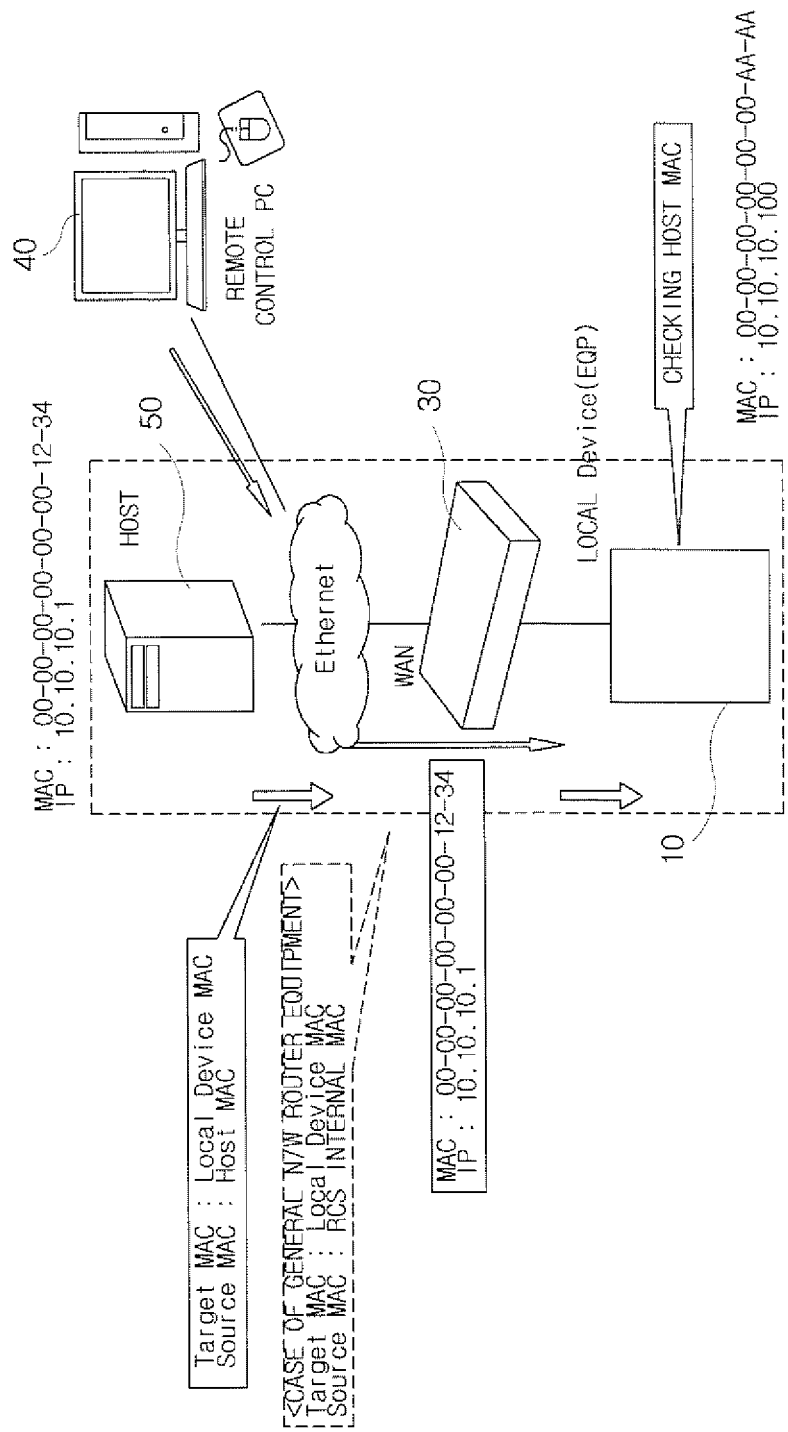
FIGS. 8 and 9 are drawings illustrating an operation of a network transmission processing unit of a remote control converter in a real-time remote control system for semiconductor automation equipment according to an embodiment of the present invention.
Figure 9:
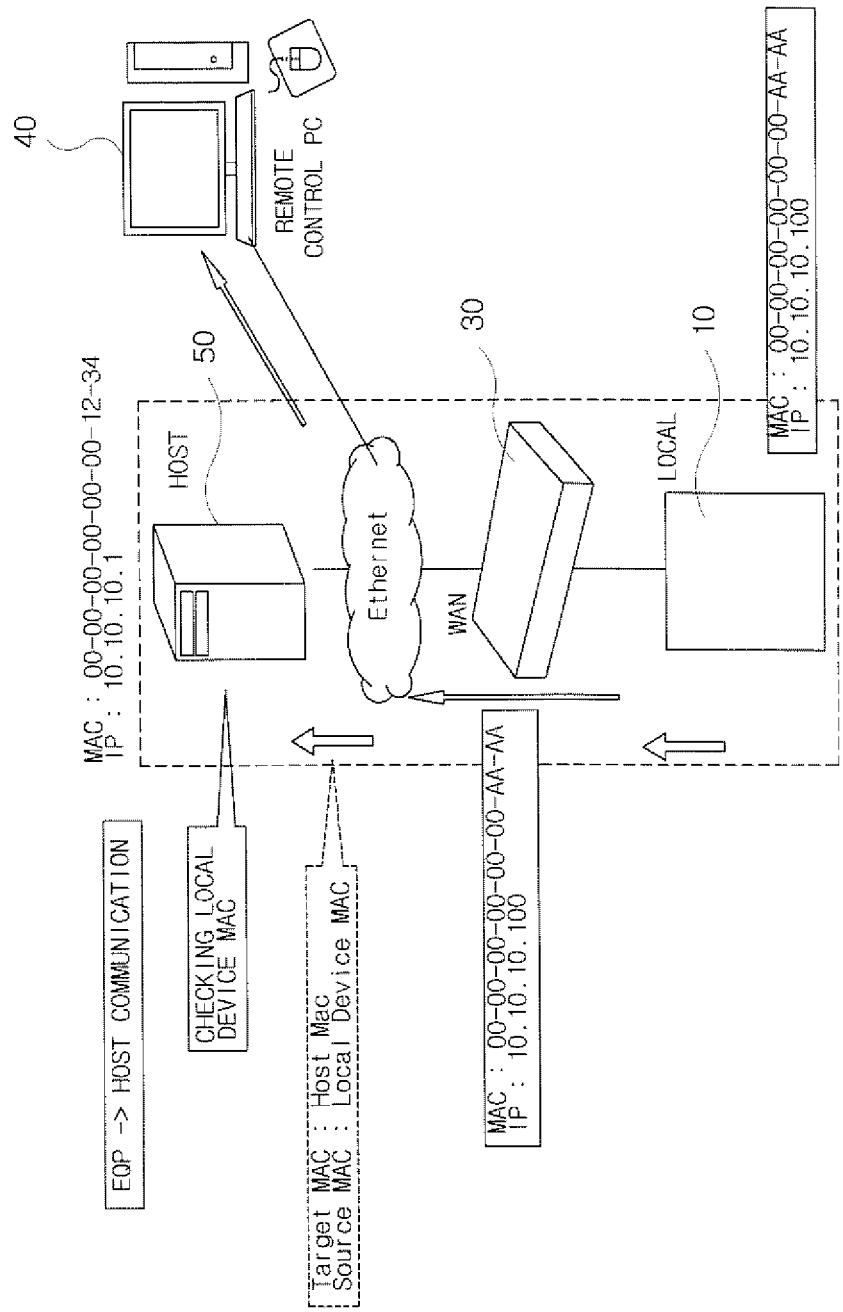

FIG. 8 is a drawing illustrating an operation of transmitting data from the remote computer 40 to the semiconductor automation equipment computer 10. The remote control converter 30 according to the present invention simultaneously sets a media access control (MAC) address (00-00-00-00-00-00-12-34) of a host 50 that is a high order communication unit and a public IP address (10.10.10.1) through the network transmission processing unit 32. In this case, a target MAC is a MAC of the semiconductor automation equipment, and a source MAC is a MAC of the host, and therefore the remote control converter 30 having the same MAC/IP as that of the host may be recognized as the host when the semiconductor automation equipment computer 10 checks the MAC of the host, thereby normal communication is possible. In addition, FIG. 9 is a diagram illustrating an operation of transmitting data from the semiconductor automation equipment computer 10 to the remote computer 40. The remote control converter 30 according to the present invention simultaneously sets a MAC address (00-00-00-00-00-00-AA-AA) of the semiconductor automation equipment computer 10 and a public IP address (10.10.10.100) through the network transmission processing unit 32. In this case, a target MAC is a MAC of the host and a source MAC is a MAC of the semiconductor automation equipment computer, and therefore the remote control converter 30 having the same MAC/IP as that of the semiconductor automation equipment computer 10 may be recognized as the semiconductor automation equipment computer 10 when the host 50 checks the MAC of the semiconductor automation equipment computer 10, thereby normal communication is possible.

In this manner, the network transmission processing unit 32 according to the present invention simultaneously uses a communication method of a MAC address and an IP copy communication method, and therefore there are advantages in that it is possible to separate data transmitted to the remote computer and data transmitted to low order semiconductor automation equipment, communication using only a public IP transmitted from a high order is possible, and extension of public IP is not required as in the related art.

Figure 10:
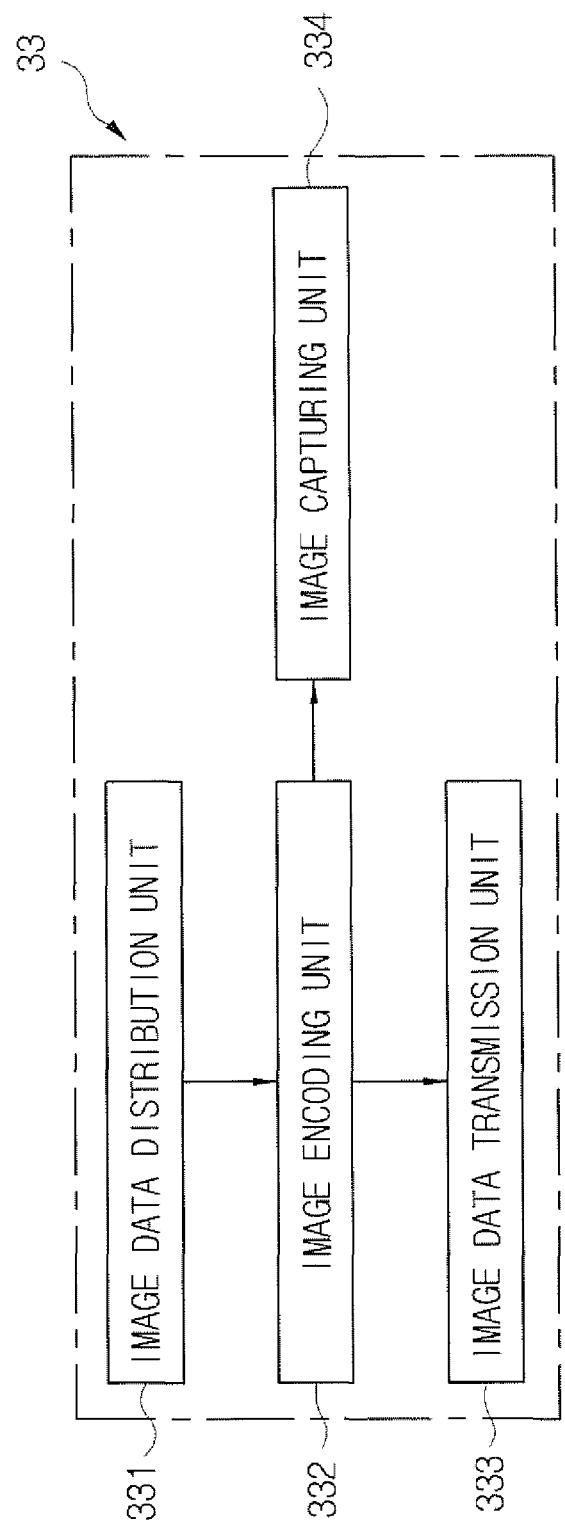
FIG. 10 is a drawing illustrating a detailed configuration of an image processing unit in a real-time remote control system for semiconductor automation equipment according to an embodiment of the present invention.

In FIG. 10, the image processing unit 33 according to the present invention receives image data output from the semiconductor automation equipment 10 and converts the received image data into image data that can be processed in the remote computer 40, and includes an image data distribution unit 331, an image encoding unit 332, an image data transmission unit 333, and an image capturing unit 334.

The image data distribution unit 331 receives an input of a video graphic array (VGA) output of the semiconductor automation equipment 10, converts the output to a set image scale, and then distributes the output to a monitor device. The image encoding unit 332 compresses an image output in 16-, 8-, 4-, 2-, 1-bit video encoding format(apply H.264 image compression technology), and sets a color depth.

In addition, the image data transmission unit 333 transmits image data compressed in the image encoding unit 332 to the outside, and the image capturing unit 334 is connected to the image encoding unit 332 to capture an output image of the semiconductor automation equipment 10.

Figure 11:
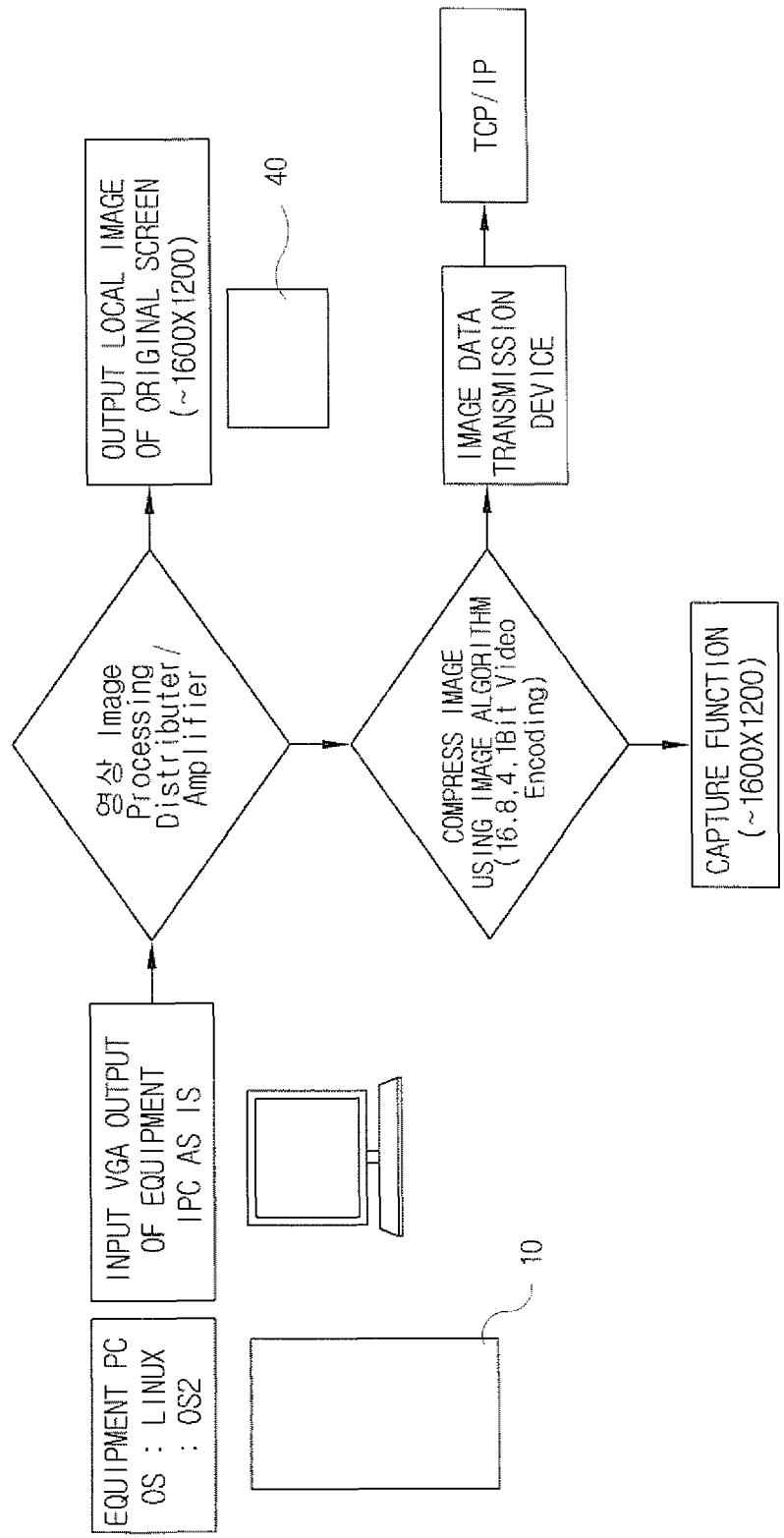
FIG. 11 is a conceptual diagram illustrating an operation of an image processing unit in a real-time remote control system for semiconductor automation equipment according to an embodiment of the present invention.
Figure 12:
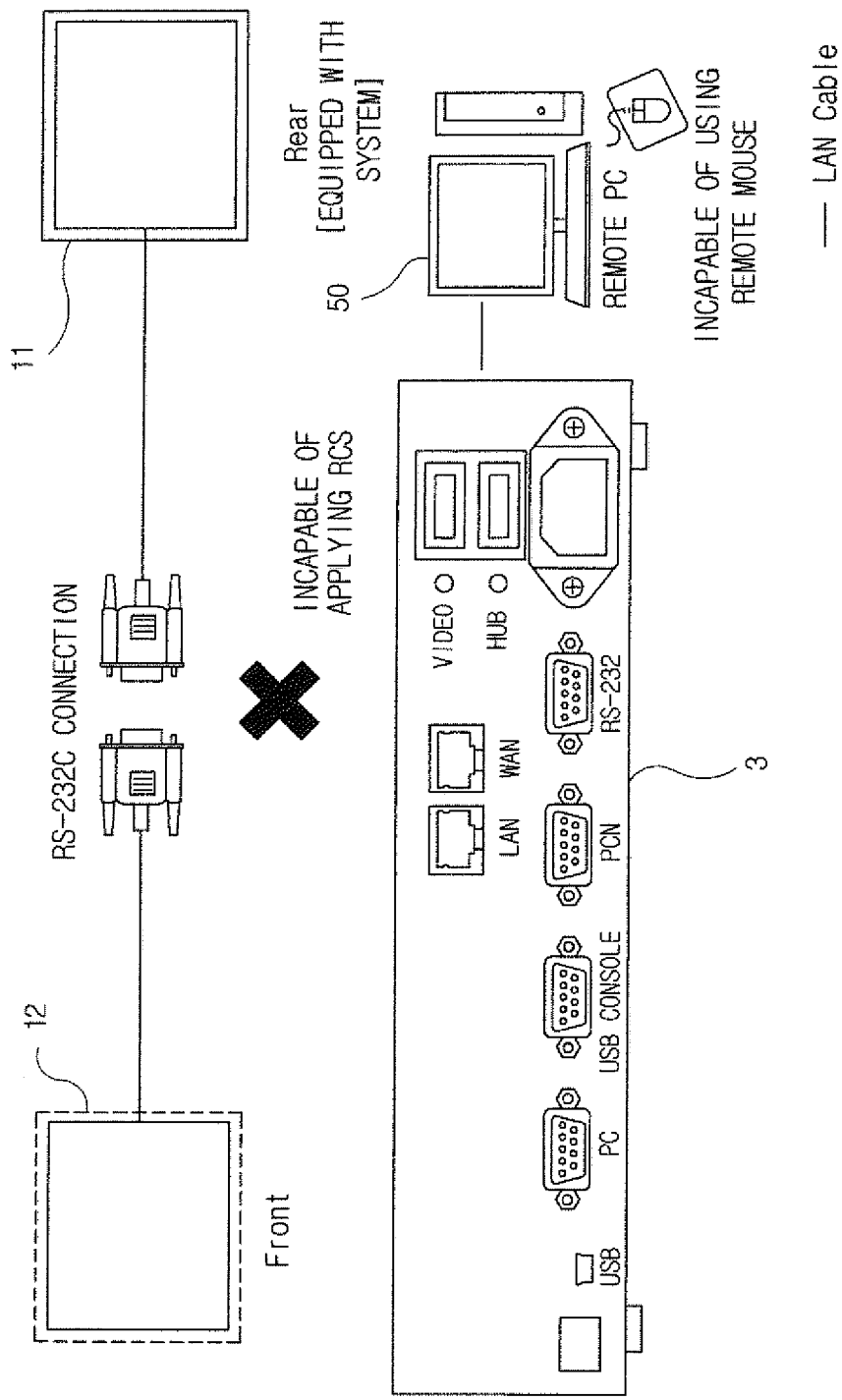
FIG. 12 is a conceptual diagram illustrating problems that occur due to USB/PS2 ports which are unsupported in a real-time remote control system for semiconductor automation equipment according to the related art.
Figure 13:
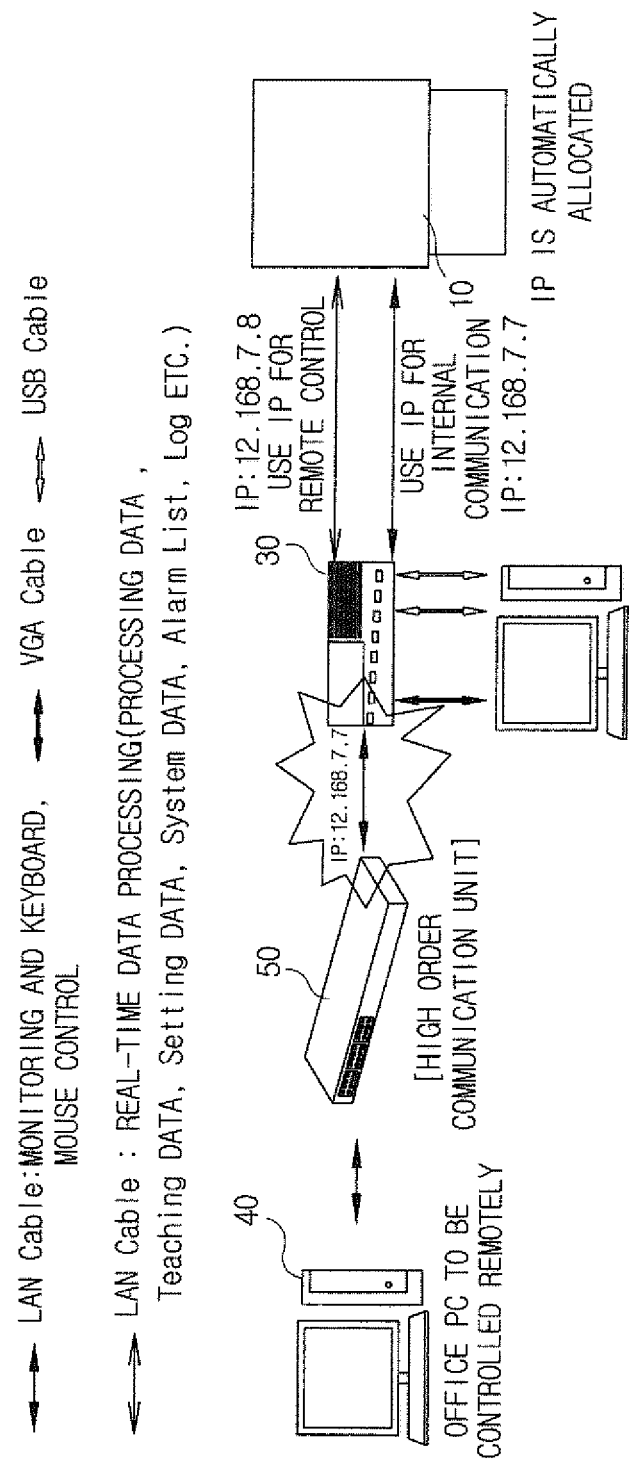
FIG. 13 is a conceptual diagram illustrating problems such as IP automatic allocation and IP extension in accordance with application of a remote control system (RCS) in a real-time remote control system for semiconductor automation equipment according to the related art.

FIG. 11 is a flowchart illustrating an operation of the image processing unit 33. Through the image processing unit 33, the image data output from the semiconductor automation equipment 10 is compressed and the image data without distortion may be provided to the remote computer 40.

As described above, in the real-time remote control system for semiconductor automation equipment according to the embodiments of the present invention, by transmitting a mouse signal of a remote computer via a serial port of the semiconductor automation equipment computer, even semiconductor automation equipment that does not support USB/PS2 ports can transmit a remote control signal through a mouse of the remote computer, and transmit a signal for monitoring or controlling an operation of the semiconductor automation equipment without a separate IP allocation operation in real-time.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A real-time remote control system for semiconductor automation equipment comprising:
 a remote control converter that connects a semiconductor automation equipment computer and a remote computer to transmit a signal for monitoring or controlling an operation of the semiconductor automation equipment; and a serial splitter that converts a mouse signal of the remote computer transmitted from the remote control converter into touch panel data of the semiconductor automation equipment computer to transmit the touch panel data, and transmits a touch panel signal between front and rear computers of the semiconductor automation equipment, wherein the remote control converter includes a serial port output unit that outputs mouse event data of the remote computer to a serial port, a network transmission processing unit that sets a media access control (MAC) address transmitted from a high order and the same IP address in accordance with a state in which processing data and setting data are transmitted from the semiconductor automation equipment computer to the remote computer and a state in which an input device control signal is transmitted from the remote computer to the semiconductor automation equipment computer, to thereby control data transmission and reception, and an image processing unit that is connected to an image output unit of the semiconductor automation equipment to convert data of the image output unit into image data capable of being processed in the remote computer, and wherein the remote computer includes a coordinate conversion unit that converts, when a mouse event of the remote computer occurs, relative coordinate data of a point at which the mouse event occurs into absolute coordinate data.

2. The real-time remote control system of claim 1, wherein the serial splitter converts absolute coordinates of a mouse pointer on a monitor of the remote computer transmitted from the remote control converter into the touch panel data of the semiconductor automation equipment computer, and the touch panel data includes x-axis and y-axis coordinate information of the absolute coordinates transmitted from the remote control converter, touch status information, and point-to-point touch information between the front and rear computers.

3. The real-time remote control system of claim 1, wherein the serial splitter generates an output signal at a predetermined time interval based on an input time, with respect to a touch signal generated in the semiconductor automation equipment computer and a touch signal generated in the remote computer.

4. The real-time remote control system of claim 1, wherein the serial splitter has a gender type that connects at least three serial ports, and includes a first terminal connected to an RS-232C port of the rear computer of the semiconductor automation equipment computer, a second terminal connected to an RS-232C port of the front computer of the semiconductor automation equipment computer, and a third terminal connected to an RS-232C port of the remote control converter.

5. The real-time remote control system of claim 1, wherein the image processing unit includes an image data distribution unit that receives a video graphic array (VGA) output of the semiconductor automation equipment, converts the output into a set image scale, and then distributes the output to a monitor device, an image encoding unit that compresses an image output in a 16-, 8-, 4-, 2-, or 1-bit video encoding format, and sets a color depth, an image capturing unit that is connected to the image encoding unit to capture an output image of the semiconductor automation equipment, and an image data transmission unit that transmits image data compressed in the image encoding unit to the outside.

6. The real-time remote control system of claim 1, wherein the network transmission processing unit sets an MAC address and an IP address of a host that is the high order communication unit when transmitting data from the remote computer to the semiconductor automation equipment computer.

7. The real-time remote control system of claim 1, wherein the network transmission processing unit sets an MAC address and an IP address of the semiconductor automation equipment computer when transmitting data from the semiconductor automation equipment computer to the remote computer.

* * * * *